Patented July 27, 1937

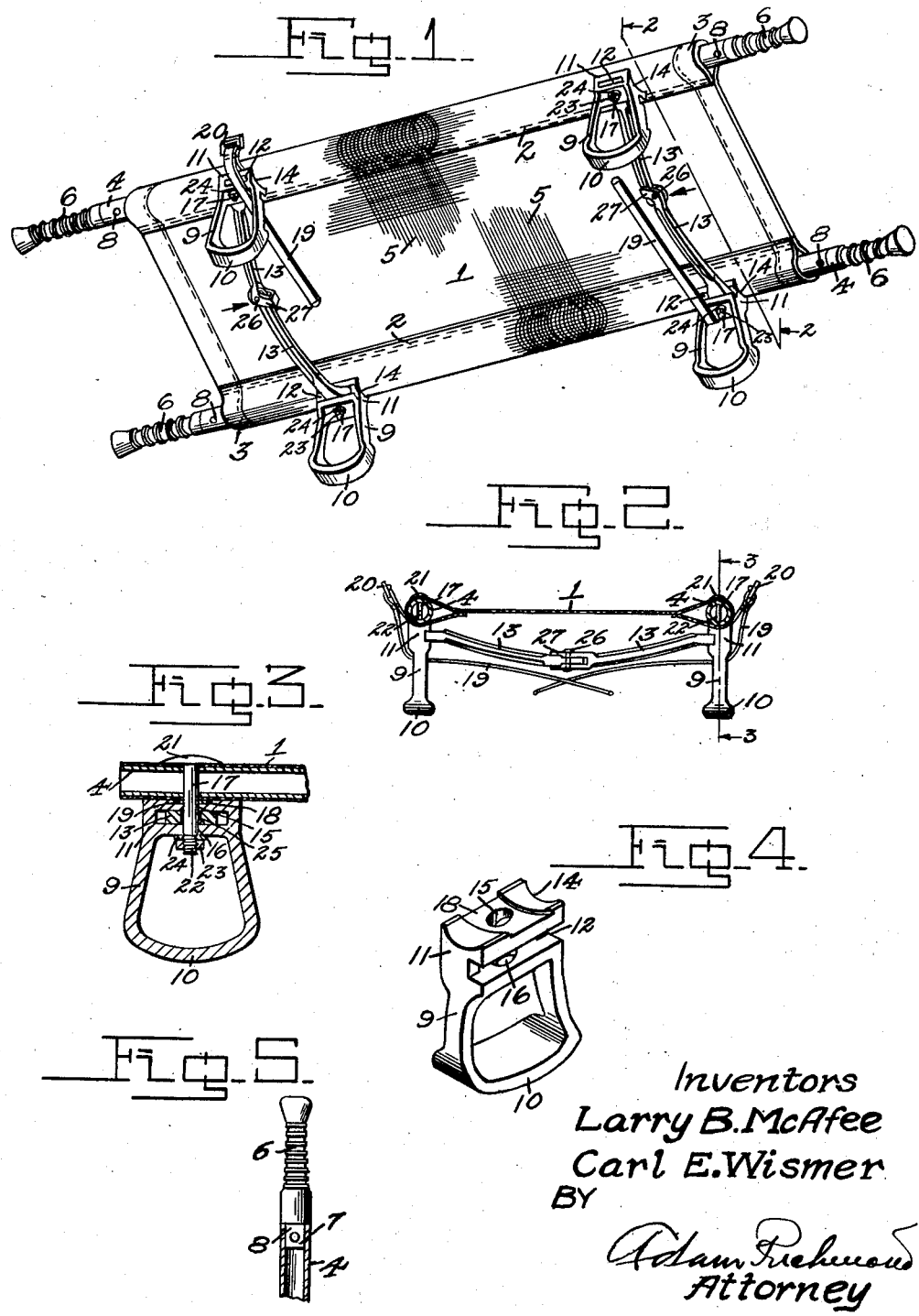

2,087,984

UNITED STATES PATENT OFFICE 2,087,984

LITTER

Larry Benjamin McAfee, Washington, D. C., and Carl Edmund Wismer, Carlisle, Pa.

Application July 2, 1936, Serial No. 88,586

11 Claims. (Cl. 5—82)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to litters or stretchers for the transportation of sick or injured persons and more particularly it is directed to an improved collapsible litter for Army use in the field or hospitals.

One of the objects of this invention is to provide an improved litter or stretcher of the kind having longitudinal side poles carrying a fabric covering and spreader bars for holding the side poles apart to stretch the fabric covering or for bringing them together to collapse the same whereby the litter may be stretched open or collapsed so that the bulk is reduced to a minimum.

Another object of this invention is to provide a collapsible litter having novel legs and a single bolt and nut for clamping the fabric covering between them and the poles, said bolts also serving as pivots for the outer ends of the spreader bars and to secure holding straps in place.

Other objects and advantages such as the use of warp threads on the fabric covering which are stitched to form pockets for the side poles and saddle seats on the legs for the side poles to prevent cutting the fabric covering around the poles, together with novel spreader bars for holding the litter expanded are also included within the scope of the invention.

With the above and other objects in view together with further objects of simplicity, cheapness in manufacture, compactness and durability, the invention consists in the novel construction and arrangement of parts which will hereinafter be brought out in the following description and illustrated in the accompanying drawing, in which:—

Fig. 1 is a perspective view showing the litter in an operative position;

Fig. 2 is a sectional view of the litter taken on line 2—2 of Fig. 1;

Fig. 3 is an enlarged vertical sectional detail view taken on line 3—3 of Fig. 2, with a portion thereof broken away;

Fig. 4 is a perspective detail view of one of the novel supporting legs for the litter; and Fig. 5 is a plan view of a wooden handle in one of the side poles, showing the side pole in section to illustrate the mode of securing the handle therein.

Referring more specifically to the drawing (1) indicates a fabric covering such as heavy canvas in which the longitudinal side edges thereof are folded and stitched at (2) to the main body portion of the covering to form pockets (3) for the reception of spaced parallel side poles (4) the warp threads (5) of the covering (1) being stitched transversely of the body portion thereof to form the pockets, so that it will support a maximum weight.

The side poles (4) which are preferably made of aluminum, are of tubular form and are provided with wooden handles (6) at their ends. A handle (6) as illustrated in Fig. 5, is provided with a reduced shank (7) extending into the end of a tubular pole (4) and having a driving fit therewith, the same being further held in place by a cross pin (8).

To support the litter above the ground or floor, supporting legs (9) are secured to the side poles (4), near their ends, each of said legs comprising a metal casting in the shape of a stirrup having a loop portion (10) which extends downwardly to provide a ground engaging portion or wide foot. The loop portions (10) of the supporting legs are closed at the top by cross members (11) each having a rectangular recess or slot (12) on the inside for the accommodation of the outer ends of a pair of spreader bars (13), the construction and operation of which will hereinafter appear. The upper faces of the cross members (11) of the supporting legs are curved inwardly or concave to provide a substantially saddle-shaped seat (14) which conforms to the curvature of the side poles so that they do not present sharp corners which would otherwise cut the fabric of the pockets (3) around the poles. At the center of the cross members (11) of the supporting legs are aligned openings (15) and (16) for the passage of clamping bolts (17).

The upper surfaces of two of the supporting legs at diagonally opposite corners are provided with diagonal recesses (18). These recesses (18) are provided to accommodate straps (19) having buckles (20) adapted to hold the litter in a collapsed or inoperative condition and the diagonal recesses permit the straps to clear the lower ends of the bolts (17) when the straps are buckled around the poles.

The clamping bolts (17) are preferably provided with oval-shaped heads (21) and have shanks (22) threaded at their lower ends to receive adjusting nuts (23) and lock washers (24). The bolt (17) is illustrated in Fig. 3 as being inserted through the fabric covering (1), side pole (4), a holding strap (19), the opening (15) provided in the cross-member (11) of the supporting leg, through an aperture (25) provided on the outer end of a spreader bar (13) and through the opening (16) below the rectangular slot (12), where it is secured in place by the nut and washer (23) and (24) respectively, the oval-shaped head (21) of the bolt (17) engaging the upper surface of the fabric covering surrounding the side pole. One bolt, in each instance, clamps the parts together to form a unitary structure.

The side poles (4) of the litter are braced and supported in spaced parallel relation when in use by means of the spreader bars (13) forming lateral supports. The outer ends of the spreader bars (13) are mounted in the slots (12) provided in the upper ends of the supporting legs (9) and pivotally connected thereto by means of the clamping bolts (17) and the inner ends of the spreader bars are pivoted together by pins (26). One spreader bar of each pair has a yoke-shaped end (27), which engages the inner edge of the other spreader bar and provides a stop to prevent outward movement of the spreader bars and permits only inward movement in the direction of the arrows as illustrated in Fig. 1. To prevent the occupant of the litter from coming into contact with the spreader bars, they are curved so their inner pivotally connected ends are substantially below the plane of their outer pivoted ends and well below the fabric covering, as illustrated in Fig. 2.

Assuming the litter stretched open for carrying a patient, as illustrated in Fig. 1, and it is desired to collapse it for transportation or storage, the spreader bars (13) are pushed inwardly in the direction of the arrows, thereby causing the side poles (4) to move toward and into contact with each other. The side poles are adapted to be held in this position by wrapping the straps (19) around the poles at each end, and connecting the free ends of the straps to the buckles (20) provided thereon. When it is desired to stretch open the litter for carrying a patient, the straps around the poles are unbuckled and the spreader bars are pushed toward the opposite ends of the litter to the positions shown in Fig. 1. The litter with a patient on it may then be lifted and transported.

It will thus be seen that the novel litter is simple in its design and very rugged in its construction. Even though it is described as comprising certain details of construction, it is nevertheless to be understood that various changes may be made therein without departing from the spirit or scope of the invention.

Having described our invention, what we claim as new and wish to secure by Letters Patent is:

1. A litter comprising in combination, a fabric covering; pockets formed on the fabric covering; a side pole mounted in each of said pockets; pairs of supporting legs near the ends of said poles; collapsible spreader bars between said legs, and means securing said legs and fabric covering to said side poles and also pivotally connecting the spreader bars to the legs.

2. A litter comprising in combination, a pair of side poles, a fabric covering spanning said poles, pairs of supporting legs near the ends of said poles, collapsible spreader bars between said legs, and means securing said legs and fabric covering to said side poles and also pivotally connecting the spreader bars to the legs.

3. A litter comprising in combination, a fabric covering having side pockets provided thereon; a pole mounted in each of said pockets; supporting legs for said litter secured adjacent the ends of said side poles; collapsible spreader bars between said supporting legs; said supporting legs each being in the form of a stirrup-shaped frame having a loop portion and a saddle-shaped seat adapted to conform to the curvature of the side poles, whereby said legs may seat the side poles without the edges thereof cutting the fabric covering surrounding the poles, and means securing said legs and fabric covering to said side poles and also pivotally connecting the spreader bars to the legs.

4. A collapsible litter comprising in combination, a fabric covering having longitudinal pockets provided on the lateral side edges thereof; a side pole mounted in each of said pockets; supporting legs for said litter adjacent the ends of said side poles; collapsible spreader bars between said poles; straps for holding said litter collapsed; said supporting legs each being in the form of a stirrup-shaped frame having a loop portion on its lower end and a cross-member containing a saddle-shaped seat on its upper end adapted to seat the side poles on said supporting legs; a diagonal slot formed in certain of said supporting legs across the said seats adapted to receive said holding straps and means for securing the supporting legs, fabric covering and holding straps to said side poles and, also pivotally connecting the spreader bars to said supporting legs.

5. A collapsible litter comprising in combination, a fabric covering having longitudinal pockets provided in the lateral edges thereof; a side pole provided in each of said pockets; straps for holding said litter collapsed; supporting legs at the ends of said pockets on said side poles; said supporting legs each being in the form of a stirrup-shaped frame having a loop portion on its lower end and a cross-member having a longitudinal aperture and a saddle-shaped seat on its upper end; diagonally opposite legs having diagonal recesses to receive said holding straps, and means for holding said side poles in spaced relation to each other, including a pair of collapsible spreader bars having their inner ends pivotally connected together and their outer ends pivotally connected to the apertures of said supporting legs.

6. A litter comprising in combination, a pair of side poles, a fabric covering spanning said poles, supporting legs for said litter, collapsible means for holding said side poles in spaced relation to each other, said means including a pair of spreader bars pivotally connected together at one end, one of said bars of each pair having a yoke-shaped portion formed on the inner end thereof adapted to engage an edge of the other bar to hold them in alignment when the litter is stretched open and additional means securing said legs and fabric covering to said side poles and also pivotally connecting the other ends of said spreader bars to the legs.

7. A litter comprising in combination, a pair of side poles, a fabric covering spanning said poles, pairs of supporting legs near the ends of said poles, collapsible spreader bars between said legs and vertically extending means securing said legs and fabric covering to said side poles and also pivotally connecting the said spreader bars to the legs, said spreader bars being pivoted about said vertically extending means.

8. A litter comprising in combination, a fabric covering, pockets formed on the fabric covering, a side pole mounted in each of said pockets, pairs of supporting legs near the ends of said poles, collapsible spreader bars between said legs, and vertically extending means securing said legs and fabric covering to said side poles and also pivotally connecting the spreader bars to the legs, said spreader bars being pivoted about said vertically extending means.

9. A litter comprising in combination, a fabric covering having side pockets, supporting legs for said litter secured adjacent the ends of said side poles, collapsible spreader bars between said supporting legs, said supporting legs each being in the form of a stirrup-shaped frame having a loop portion and a saddle-shaped seat adapted to conform to the curvature of the side poles, whereby said legs may seat the side poles without the edges thereof cutting the fabric covering surrounding the poles and vertically extending means securing said legs and fabric covering to said side poles and also pivotally connecting the spreader bars to the legs, said spreader bars being pivoted about said vertically extending means.

10. A collapsible litter comprising in combination, a fabric covering having longitudinal pockets provided on the lateral side edges thereof, a side pole mounted in each of said pockets, supporting legs for said litter adjacent to the ends of said side poles, collapsible spreader bars between said poles, straps for holding said litter collapsed; said supporting legs each being in the form of a stirrup-shaped frame having a loop portion on its lower end and a cross-member containing a saddle-shaped seat on its upper end adapted to seat the side poles on said supporting legs, a diagonal slot formed in certain of said supporting legs across the said seats adapted to receive said holding straps and vertically extending means for securing the supporting legs, fabric covering and holding straps to said side poles and also pivotally connecting the spreader bars to said supporting legs, said spreader bars being pivoted about said vertically extending means.

11. A litter comprising in combination, a pair of side poles, a fabric covering spanning said poles, supporting legs for said litter, collapsible means for holding said side poles in spaced relation to each other, said means including a pair of spreader bars pivotally connected together at one end, one of said bars of each pair having a yoke-shaped portion formed on the inner end thereof adapted to engage an edge of the other bar to hold them in alignment when the litter is stretched open, and vertically extending means securing said legs and fabric covering to said side poles and also pivotally connecting the other ends of said spreader bars to the legs, the said last mentioned ends of said spreader bars being pivoted about said vertically extending means.

LARRY BENJAMIN McAFEE.
CARL EDMUND WISMER.